April 25, 1961 N. J. JAMMAL 2,981,272
BATTERY NON-SPILL VENT PLUG
Filed April 2, 1959
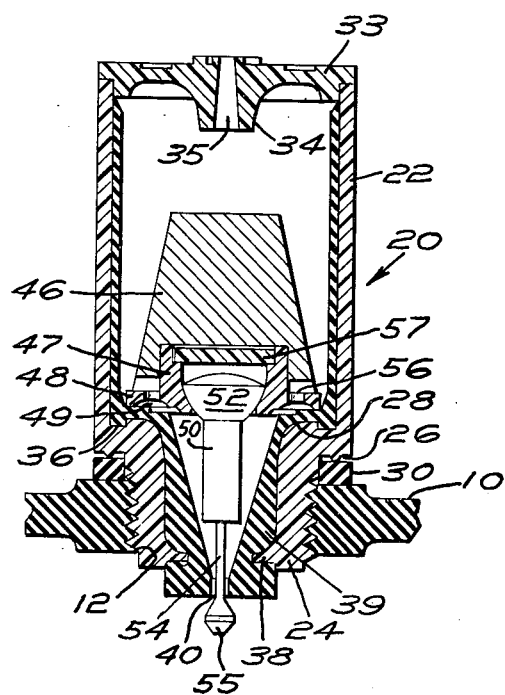
INVENTOR:
NICHOLAS J. JAMMAL
BY:
Beau, Brooks, Buckley & Beau,
ATTORNEYS.

2,981,272
BATTERY NON-SPILL VENT PLUG

Nicholas J. Jammal, Ashtabula, Ohio, assignor to Gould National Batteries, Inc., St. Paul, Minn.

Filed Apr. 2, 1959, Ser. No. 803,765

5 Claims. (Cl. 137—43)

This invention relates to non-spill type vent plugs for storage battery cells, which permit venting of the battery gases under normal operation when the cell is in substantially upright attitude while operating automatically to prevent spilling of electrolyte therefrom when the cell is tilted abnormally, such as for example in airplane use. The present invention relates to and is an improvement over the type of vent plug disclosed for example in U.S. Patent 2,405,736.

The vent plug of this invention is characterized by provision of an improved valve structure arrangement wherein a relatively small diameter vent passage is provided through an annular valve seat, with a valve member carried by a stem extending through the vent passage and coupled with a "topple" type weight, thereby insuring positive displacement of the valve member concurrent with each tilting and return motion of the weight.

An object of the present invention is to provide an improved vent control valve in a device as aforesaid of the type which is closed automatically by the action of a weight movable in response to abnormal tilting of the cell, and wherein the critical dimension parts are of improved construction whereby the valve will more positively and surely return to open position in response to reverse tilting of the weight when the cell is returned to normal or generally upright position.

Another object of the present invention is to provide an improved valve as aforesaid wherein the critically dimensioned parts are of integral construction and of structurally simplified form, whereby the device may be more easily and surely constructed to provide the exact critical dimensions required in the completed device for perfect operation thereof.

Another object of the invention is to provide an improved valve as aforesaid which is more durable and will better withstand vibration and other disturbing influences incident to its use and operation.

Other objects and advantages of the invention will be apparent from the following description; reference being made to the accompanying drawing comprising a sectional view illustrating a non-spill vent plug embodying the present invention installed upon a storage battery cell cover of which only a fragment is shown.

Referring to the drawing, 10 designates the top wall or cover of a battery cell containing the customary plate assemblies and liquid electrolyte; the cover 10 being provided with the usual internally threaded vent plug opening 12. The vent plug of the invention is designated generally at 20 and comprises a generally cylindrically shaped housing 22 molded from a suitable acid-resisting material, such as a natural or synthetic plastic, hard rubber or the like. The housing 22 is formed to include at its lower end a reduced diameter tubular portion 24, formed integral with the portion 22 and thereby providing an external shoulder 26, and an internal shoulder 28.

The reduced portion 24 is externally threaded to fit into the threaded cell opening 12. A soft gasket 30 is provided under the shoulder 26 so that when the member 22 is threaded into the cell cover an effective liquid seal is formed against any liquid electrolyte leaking through the threads referred to. The upper end of the housing 22 is provided with a tight fitted cover 33 having a cylindrical projection 34 depending from its lower side through which a vent opening 35 passes so that the interior of the body 22 is in communication with the ambient atmosphere. The cover 33 is secured in position to the body 22 in any suitable manner as by pressfitting, screw threading, cementing, or the like.

An annular recess 36 is formed in the shoulder portion 28 and an inturned flange 38 is formed near the lower end of the portion 24. A soft rubber inner lining 39 is molded in situ internally of the housing, and thus is anchored in place by the recess 36 and flange 38. This liner 39 is formed with a central gas inlet 40 providing communication between the interior of the battery cell and the interior of the housing 22.

A frusto-conically shaped weight 46 formed of lead or the like is molded or cast upon a hat-sectioned plastic base member 47 terminating in an annular base portion 48 which normally rests flatwise upon the flat area of the inner liner where it covers the shoulder 28. The portion 48 is preferably relieved as indicated at 49 to minimize any sticking tendency from suction between the base and the soft rubber lining. The plastic "hat" piece is formed with a central cavity of semi-spherical form through the bottom of which the stem 50 of the valve extends. The stem 50 is of hard plastic or other material and is formed with a spherically shaped head or anchor portion 52 at its upper end which swivably seats in the cavity of the member 47 to suspend the valve stem from the weight 46. Thus, the part 52 is supported by a ball-and-socket or "universal joint" type connection permitting the valve stem to rock in any direction relative to the weight 46. At its lower end the stem 50 receives in threaded relation therein a valve rod 54 which extends through the opening 40 of the liner 39, and at its lower end the rod 54 carries an integrally formed tapered valve head 55. The rod and head 55 are preferably formed of stainless steel, or the like.

The base 48 normally rests upon the ledge area of the rubber liner 39 above the shoulder 28, and the periphery of the base 48 is provided with spaced vents 56 to provide communication between the spaces below and above the ledge when the weight 46 is settled in upright position as shown in the drawing. The base 47 is provided with a plastic cap piece 57 to prevent filling of the cavity when the heavy body 46 is molded on the base. Thus, the lead body 46 may be cast to the base 47 after the valve stem 50 and the cap piece 57 are assembled in the positions shown.

As shown in the drawing, the parts are so arranged that by action of gravity the weight 46 falls to rest upon the shoulder area of the soft rubber liner when the battery is in a substantially upright position. However, the metal cast to the base 47 extends a substantial distance above the base so that the center of gravity of the weight 46 is located substantially above the base 47. Hence, whenever the cell is tilted from the vertical through a sufficient angle, a position will thus be reached where the vertical line through the center of gravity of the weight will pass outside of the edge of its supporting base and the weight will then tip over to pull up the valve stem 50, thus closing the valve 55 against the bottom end of the lining member 39. In this position the upper surface of the valve head 55 bears against and makes line contact with the edge of the opening 40 in the lining 39, thereby preventing liquid electrolyte from entering the interior of the body 22. Then, when the cell is returned to its normal or vertical position the weight 46 drops by gravity into flatwise attitude relative to the shoulder inside the casing to cause the valve rod 50 to move downwardly, thus causing the valve 55 to open relative to the opening 40.

It is a particular feature of the present invention that the aperture 40 in the liner 39 is of minimum cross sectional area, and that the valve 55 is carried by the valve stem for positive movement therewith whenever it is pulled upon and when struck by the weight 47; and that valve 55 has substantially only line contact with the valve seat formed by the marginal edge of the opening 40. Hence, the gas pressure which accumulates in the cell while the battery is abnormally tilted or inverted cannot effectively block reopening of the valve 55. However, upon return of the cell towards its normal upright attitude the weight 47 topples as explained hereinabove, and as it falls towards its normal flatwise position of rest upon the shoulder, the cover portion 57 taps against the upper end of the valve stem, but only as the weight nears its flatwise position due to lost-motion connection between the cap 57 and the top of the valve stem. This drives the valve downwardly away from the opening 40 whereupon the cell gas escapes around the valve stem and through the grooves 56 in the base 37 and thence into the casing 22 and out the opening 35.

The soft rubber lining 39 of the structure provides two distinct advantages. Firstly, it absorbs shocks and vibrations incident to the action of the weight when tipping and returning to its upright position. Secondly, the liner is high-pressure-molded with great precision into the premolded casing 22, and thus the critical dimensions required for proper functioning of the valve may be more easily obtained in spite of existing minor variations in the dimensions of the housing member 22 and the other parts involved. For example, it is most critical that the distance from the top of the shoulder to the valve contact point at the bottom end of the liner unit be exact.

While only one embodiment of the invention has been illustrated and described in detail herein, it is to be understood that various changes might be adopted, without departing from the scope of the claims as follows.

I claim:

1. A non-spill battery cell vent plug for a cell having a cover and holding electrolyte which evolves gas under cell operating conditions, said plug comprising a rigid tubular housing having a shouldered internal bore open at the inner end of the housing, a soft resilient lining within said housing shaped to complement and cover the internal shoulder thereof and extending through the opening at the inner end of said housing and beyond and being formed at its extreme inner end portion with a reduced size bore terminating in a valve seat, a topple member disposed within the housing and normally resting on the lining portion covering said housing shoulder and adapted to tilt within the housing toward the side wall thereof when the housing is inclined beyond a certain angle from the vertical; and a valve stem having a lost motion connection with the topple member and extending through the valve seat and having at its bottom end a valve head facing the valve seat, whereby tilting of the housing beyond said certain angle causes the topple member to pull upon said stem to move the valve head into vent closing position against said valve seat, and whereby return of the housing toward vertical position causes the topple member to move again to first release said stem and them to knock against the stem to break the seal between the valve head and the valve seat and to move said valve head to vent open position.

2. A non-spill battery cell vent plug for a cell having a cover and holding electrolyte which evolves gas under cell operating conditions, said plug comprising a housing open at the inner end thereof, a soft resilient lining within said housing and having an internal shoulder and extending through the opening at the inner end of said housing and beyond and being formed at its extreme inner end portion with a bore terminating in a valve seat, a topple member disposed within the housing and normally resting on the shoulder portion of said lining and adapted to tilt within the housing toward the side wall thereof when the housing is inclined beyond a certain angle from the vertical; and a valve stem having a connection with the topple member and extending through the valve seat and having at its bottom end a valve head facing the valve seat, whereby tilting of the housing beyond said certain angle causes the topple member to pull upon said stem to move the valve head against said valve seat, and whereby return of the housing toward vertical position causes the topple member to move to pressure the stem to break the seal between the valve head and the valve seat and to move said valve head to vent open position.

3. A non-spill battery cell vent plug for a cell having a cover and holding electrolyte which evolves gas under cell operating conditions, said plug comprising a rigid tubular housing having a shouldered internal bore open at the inner end of the housing, a soft resilient lining within said housing shaped to complement and cover the internal shoulder thereof and extending through the opening at the inner end of said housing and beyond and being formed at its extreme inner end portion with a bore terminating in a valve seat, a topple member disposed within the housing and normally resting on the lining portion covering said housing shoulder and adapted to tilt within the housing toward the side wall thereof when the housing is inclined beyond a certain angle from the vertical; and a valve stem having connection with the topple member and extending through the valve seat and having at its bottom end a valve head facing the valve seat, whereby tilting of the housing beyond said certain angle causes the topple member to pull upon said stem to move the valve head against said valve seat, and whereby return of the housing toward vertical position causes the topple member to move to pressure the stem to break the seal between the valve head and the valve seat and to move said valve head to vent open position.

4. A non-spill battery cell vent plug for a cell having a cover and holding electrolyte which evolves gas under cell operating conditions, said plug comprising a rigid tubular housing having an inturned flange thereat and a shouldered internal bore open at the inner end of the housing, a soft resilient lining within said housing shaped to complement and lock upon said housing and to cover the internal shoulder thereof and extending through the opening at the inner end of said housing and beyond and being locked at its extreme inner end portion upon said flange and formed with a bore terminating in a valve seat, a topple member disposed within the housing and normally resting on the lining portion covering said housing shoulder and adapted to tilt within the housing toward the side wall thereof when the housing is inclined beyond a certain angle from the vertical; and a valve stem having connection with the topple member and extending through the valve seat and having at its bottom end a valve head facing the valve seat.

5. A non-spill battery cell vent plug for a cell having a cover and holding electrolyte which evolves gas under cell operating conditions, said plug comprising a rigid tubular housing having a shouldered internal bore open at the inner end of the housing, a soft resilient lining injection molded in situ within said housing and thereby shaped to complement and cover the internal shoulder thereof and to extend through the opening at the inner end of said housing and beyond and being formed with a bore terminating in a valve seat disposed precisely at a predetermined distance from the top surface of the shoulder portion of said lining, a topple member disposed within the housing and normally resting on the lining portion covering said housing shoulder and adapted to tilt within the housing toward the side wall thereof when the housing is inclined beyond a certain angle from the vertical; and a valve stem having a lost motion connection with the topple member and extending through the valve seat and having at its bottom end a valve head facing the valve seat, whereby tilting of the housing beyond said certain angle causes the topple member to pull upon said stem to move the valve head into vent closing position against said valve seat, and whereby return of the housing toward vertical position causes the topple member to move again to pressure the stem to break the seal between the valve head and the valve seat and to move said valve head to vent open position.

References Cited in the file of this patent

UNITED STATES PATENTS

| | | |
|---|---|---|
| 1,963,684 | Shimer | June 19, 1934 |
| 2,533,880 | Donkin | Dec. 12, 1950 |
| 2,769,452 | Gill | Nov. 6, 1956 |